US012395791B2

(12) United States Patent
Stanescu et al.

(10) Patent No.: US 12,395,791 B2
(45) Date of Patent: Aug. 19, 2025

(54) SELECTIVE MICROPHONE USE FOR AUDIO CONFERENCING

(71) Applicant: Lenovo (Singapore) Pte. Ltd., Singapore (SG)

(72) Inventors: George-Andrei Stanescu, Morrisville, NC (US); Florin Cazacu, Morrisville, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 269 days.

(21) Appl. No.: 18/149,172

(22) Filed: Jan. 3, 2023

(65) Prior Publication Data

US 2024/0223946 A1 Jul. 4, 2024

(51) Int. Cl.

| | |
|---|---|
| ***H04R 3/00*** | (2006.01) |
| ***G10K 11/178*** | (2006.01) |
| ***H04R 1/40*** | (2006.01) |
| ***H04R 5/027*** | (2006.01) |
| ***H04S 1/00*** | (2006.01) |

(52) U.S. Cl.

CPC ....... *H04R 3/005* (2013.01); *G10K 11/17823* (2018.01); *G10K 11/17873* (2018.01); *H04R 1/406* (2013.01); *H04R 5/027* (2013.01); *H04S 1/007* (2013.01); *G10K 2210/108* (2013.01); *G10K 2210/3027* (2013.01); *H04S 2400/15* (2013.01)

(58) Field of Classification Search

None

See application file for complete search history.

(56) References Cited

U.S. PATENT DOCUMENTS

| | | | | |
|---|---|---|---|---|
| 4,658,425 | A | 4/1987 | Julstrom | |
| 10,321,251 | B1 * | 6/2019 | Thorson | G06F 5/10 |
| 2009/0190769 | A1 * | 7/2009 | Wang | H03G 3/32 381/66 |
| 2010/0161856 | A1 * | 6/2010 | Ding | H04R 3/00 710/62 |

OTHER PUBLICATIONS

"Haas Effect." Cockos Incorporated Forums, May 10, 2016, forums.cockos.com/showthread.php?t=176666. (Year: 2016).*

"Acoustic Testing", DataPhyiscs, retrieved on Nov. 8, 2022 from https://www.dataphysics.com/applications/dynamic-signal-analysis/acoustic-testing/.

(Continued)

*Primary Examiner* — James K Mooney

(74) *Attorney, Agent, or Firm* — John M. Rogitz; John L. Rogitz

(57) ABSTRACT

In one aspect, a first device includes at least one processor and storage accessible to the at least one processor. The storage includes instructions executable by the at least one processor to receive first input from a first microphone and to receive second input from a second, different microphone. The instructions are also executable to, based on one or more identified audio characteristics of the first and second inputs, select one of the first and second microphones as an operative microphone from which third input of a person speaking is provided to a second device as part of an audio conference. The instructions are then executable to provide the third input of the person speaking to the second device as part of the audio conference.

20 Claims, 6 Drawing Sheets

(56) References Cited

OTHER PUBLICATIONS

"Audio system measurements", Wikipedia, retrieved on Nov. 8, 2022 from Audio_system_measurements.

Kumar et al., "Study of Microphone Array Characteristics and Noise Reduction", International Journal of Applied Engineering Research ISSN 0973-4562 vol. 13, No. 12 (2018) pp. 10826-10830, retrieved from https://www.ripublication.com/ijaer18/ijaerv13n12_100.pdf.

* cited by examiner

SELECTIVE MICROPHONE USE FOR AUDIO CONFERENCING

FIELD

The disclosure below relates to technically inventive, non-routine solutions that are necessarily rooted in computer technology and that produce concrete technical improvements. In particular, the disclosure below relates to selective microphone use for audio conferencing.

BACKGROUND

As recognized herein, while a user participates in an audio conference, two or more connected microphones might pick up the user's speech. However, as also recognized herein, the user's device might have one of those microphones set by default as the one from which input is used as part of the audio conference, even if that microphone is generating inferior audio compared to other available microphones due to distance from the user, background noise, etc. This in turn can result in less than optimal audio being used as part of the video conference. There are currently no adequate solutions to the foregoing computer-related, technological problem.

SUMMARY

Accordingly, in one aspect a first device includes at least one processor and storage accessible to the at least one processor. The storage includes instructions executable by the at least one processor to receive first input from a first microphone and to receive second input from a second microphone. The second microphone is different from the first microphone. The instructions are also executable to, based on one or more identified audio characteristics of the first and second inputs, select one of the first and second microphones as an operative microphone from which third input of a person speaking is provided to a second device as part of an audio conference. The instructions are then executable to provide the third input of the person speaking to the second device as part of the audio conference.

Accordingly, in certain example implementations the one or more identified audio characteristics may include a first volume level associated with the first input and a second volume level associated with the second input, and the first microphone may be selected as the operative microphone based on the first volume level being greater than the second volume level. Additionally or alternatively, the one or more identified audio characteristics may include a first clarity level associated with the first input and a second clarity level associated with the second input, and the first microphone may be selected as the operative microphone based on the first clarity level being better than the second clarity level.

Also in some example implementations, the one or more identified audio characteristics may be first one or more identified audio characteristics and the person may be a first person. In these example implementations, the instructions may be executable to, in a first instance and based on the first one or more identified audio characteristics of the first and second inputs, select the first microphone as the operative microphone from which the third input of the first person speaking is provided to the second device as part of the audio conference. The instructions may then be executable to, in the first instance, provide the third input from the first microphone to the second device as part of the audio conference. The instructions may also be executable to, in a second instance subsequent to the first instance, receive fourth input from the first microphone and to receive fifth input from the second microphone. The instructions may then be executable to, in the second instance and based on second one or more identified audio characteristics of the fourth and fifth inputs, select the second microphone as an operative microphone from which sixth input of a second person speaking is provided to the second device as part of the audio conference. The second person may be different from the first person. The instructions may then be executable to, in the second instance, provide the sixth input of the second person speaking to the second device as part of the audio conference.

In addition to or in lieu of the foregoing, in some example implementations the instructions may be executable to, based on the one or more identified audio characteristics of the first and second inputs, select the first microphone as the operative microphone from which the third input of the person speaking is provided to the second device as part of the audio conference. Here the instructions may then be executable to use the second input to generate one or more noise cancellation signals, where the noise cancellation signals may relate to noise other than the person speaking but that occurs while the person is speaking. So, for example, the instructions may then be executable provide both the third input of the person speaking and the noise cancellation signals to the second device as part of the audio conference. Additionally or alternatively, the instructions may be executable to generate composite audio signals including both the third input and the noise cancellation signals and then provide the composite audio signals to the second device as part of the audio conference.

Furthermore, in various example embodiments the first device may include the first microphone and/or the second microphone. Additionally, the second device may include a coordinating server and/or a client device. Also in example embodiments, the audio conference may be an audio/video (A/V) conference. Still further, if desired the selection of one of the first and second microphones may be performed in a kernel of the first device and/or by an audio conferencing software application. What's more, in various examples selection of one of the first and second microphones may be performed by a first processor that is different from a central processing unit (CPU) of the first device, where the first processor may be a processor in a universal serial bus (USB) device inserted into a USB port of the first device.

Additionally, in certain specific examples the instructions may be executable to, based on the one or more identified audio characteristics of the first and second inputs, select the first microphone as the operative microphone from which the third input is provided to the second device as part of the audio conference, where the first input and the third input are the same input or different inputs.

In another aspect, a method includes receiving, at a first device, first input from a first microphone. The method also includes receiving, at the first device, second input from a second, different microphone. The method then includes, based on one or more identified audio characteristics of the first and second inputs, selecting one of the first and second microphones as an operative microphone from which third input of a person speaking is provided to a second device as part of an audio conference. The method also includes providing the third input of the person speaking to the second device as part of the audio conference.

Accordingly, in certain specific example implementations the one or more identified audio characteristics may include a first volume level associated with the first input and a second volume level associated with the second input, and here the method may include selecting the first microphone as the operative microphone based on the first volume level being greater than the second volume level. Additionally or alternatively, the one or more identified audio characteristics may include a first clarity level associated with the first input and a second clarity level associated with the second input, and here the method may include selecting the first microphone as the operative microphone based on the first clarity level being better than the second clarity level.

In still another aspect, at least one computer readable storage medium (CRSM) that is not a transitory signal includes instructions executable by at least one processor to receive first input from a first microphone and receive second input from a second, different microphone. The instructions are then executable to, based on one or more identified audio characteristics of the first and second inputs, select the first microphone as an operative microphone from which third input of a person speaking is provided to a client device as part of an audio conference. The instructions are then executable to provide the third input of the person speaking to the client device as part of the audio conference.

In certain example embodiments, the at least one processor may include a processor of a server that routes audio of the audio conference between client devices.

Also in certain example embodiments, the instructions may be executable to use input from the second microphone to determine an offset to use for production of stereo audio signals. The instructions may also be executable to generate, using the offset, the stereo audio signals themselves. The stereo audio signals may be generated from mono audio signals received from the first microphone, where the mono audio signals may include the third input. The instructions may then be executable to provide the stereo audio signals to the client device as part of the audio conference.

The details of present principles, both as to their structure and operation, can best be understood in reference to the accompanying drawings, in which like reference numerals refer to like parts, and in which:

DETAILED DESCRIPTION

Figure 1:
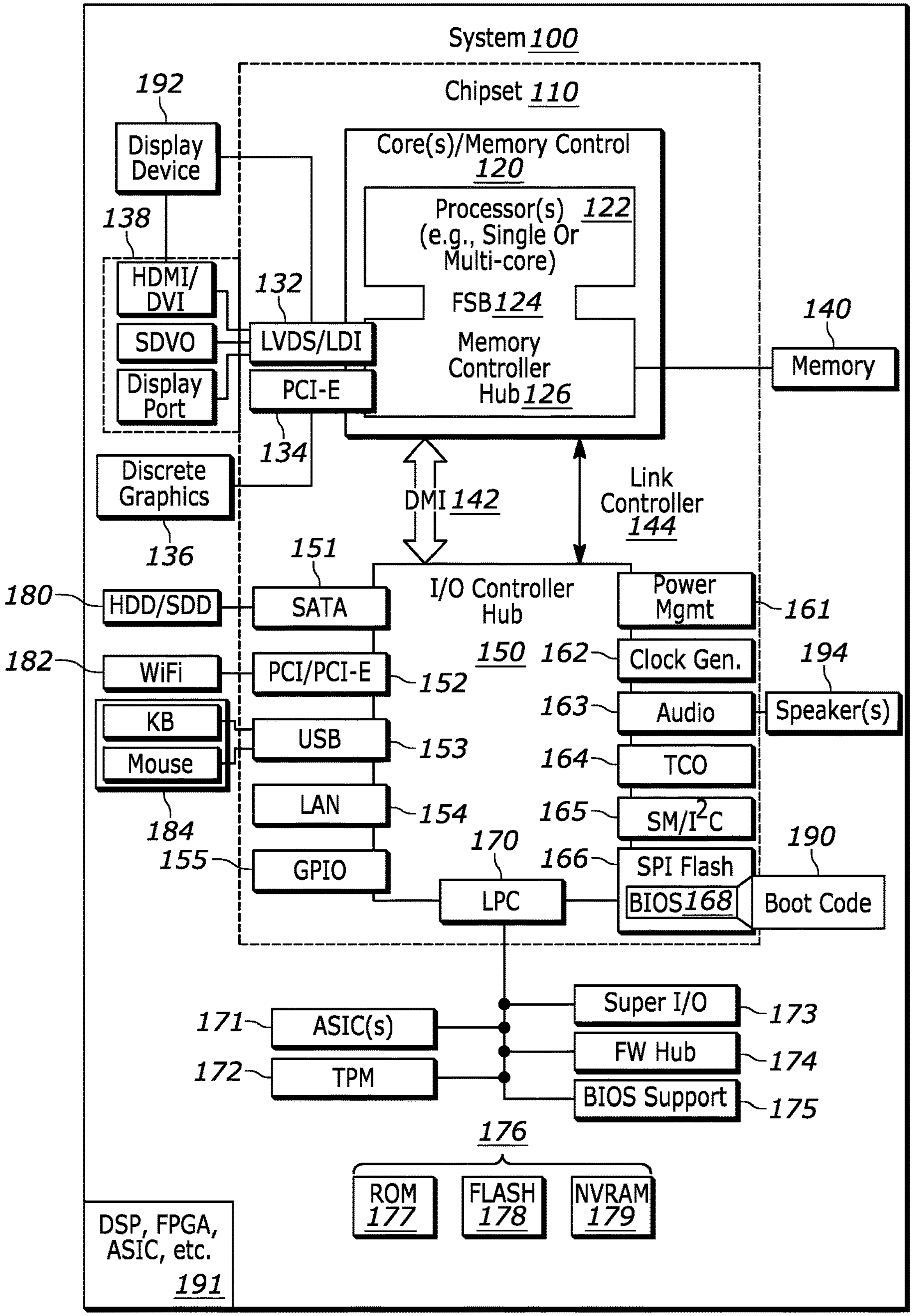
FIG. 1 is a block diagram of an example system consistent with present principles.

Among other things, the detailed description below discusses devices and methods for dynamically selecting a best microphone to use to provide a best possible audio quality based on the available microphones. In some examples, some or all of the available microphones may be effectively aggregated into a microphone array in order to further improve the quality. Thus, audio signal processing techniques may be used to objectively measure quality of signals from the different microphones. Additionally, in examples where the microphones are used as a microphone array, the devices and methods may convert input from a selected microphone from mono to stereo sound and might even further improve the quality by reducing background noise (e.g., through active noise cancellation).

Accordingly, in one example implementation a physical or virtual device may interface as a microphone with a host communication device. The physical or virtual device may do so to act as a multiplexer in the sense that it may collect input from the available physical microphones and select the one with the best objective measured quality to be passed on to the host communication device. The physical or virtual device may also do so to aggregate multiple physical microphones into a microphone array, perform audio signal processing to improve the sound quality, and afterward pass the result to the host communication device to be used by various applications.

Thus, in various examples the foregoing functionalities may be implemented in a hardware device and/or as a software/firmware application. The hardware device can be either integrated in the host device or can be attached to the host device (e.g., by using an USB port). Also in various examples, the software application can be implemented, from an operating system perspective, either in user-space or kernel-space and can include a virtual device connected the host machine.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces/ports 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more other processors 191 besides a central processing unit (CPU) (e.g., where the CPU is established by one of the processors 122). The one or more other processors 191 may execute functions related to audio conferencing consistent with present principles in conjunction with the CPU or even independently without aid of the CPU. The one or more processors 191 may include, as examples, a digital signal processor (DSP), a field-programmable gate array (FPGA), and/or an application-specific integrated circuit (ASIC). Using a dedicated processor such as a DSP, FPGA, or ASIC may result in less processing delays and therefore higher-fidelity, uninterrupted conference audio.

Additionally, though not shown for simplicity, in some embodiments the system 100 may include a gyroscope that senses and/or measures the orientation of the system 100 and provides related input to the processor 122, an accelerometer that senses acceleration and/or movement of the system 100 and provides related input to the processor 122, and/or a magnetometer that senses and/or measures directional movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video. Also, the system 100 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
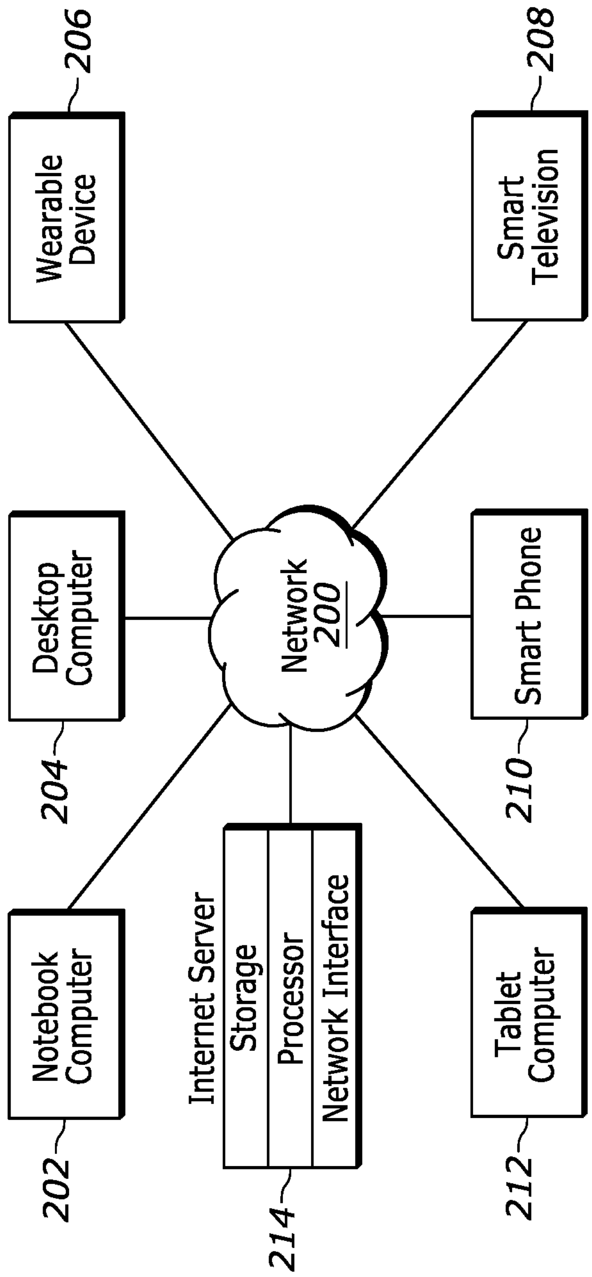
FIG. 2 is a block diagram of an example network of devices consistent with present principles.

Turning now to FIG. 2, example devices are shown communicating over a network 200 such as the Internet in accordance with present principles (e.g., for client devices to participate in audio conferencing). It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows client devices including a notebook/laptop computer and/or convertible computer 202, a desktop computer 204, a wearable device 206 such as a smart watch, a smart television (TV) 208, a smart phone 210, and a tablet computer 212. FIG. 2 also shows a coordinating server 214 such as an Internet server that may provide cloud storage accessible to the devices 202-212 and route communications between the client devices themselves. It is to be understood that the devices 202-214 may be configured to communicate with each other over the network 200 to undertake present principles (e.g., to facilitate audio conferencing).

Figure 3:
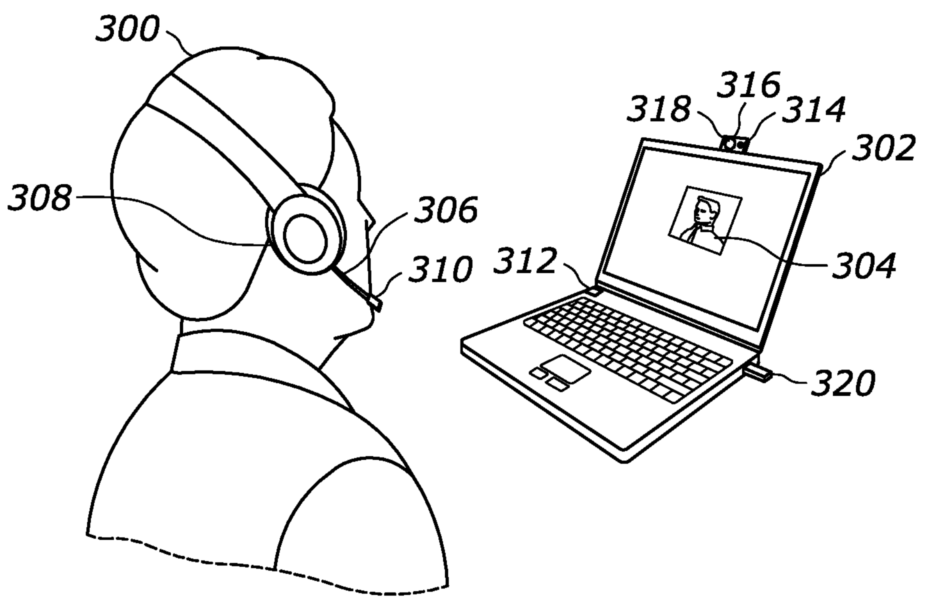
FIGS. 3 and 4 illustrate example use cases for audio conferencing consistent with present principles.

Now in reference to FIG. 3, suppose a first user 300 is using a laptop computer 302 to participate in an audio/video (A/V) conference over the Internet with a remotely-located second user 304. As shown in FIG. 3, the user 300 might be wearing a headset 306 that has both a speaker 308 to present conference audio to the user's ear as well as a microphone 310 at which audible input from the user 300 is detectable. However, in addition to the laptop being connected to the headset 306 for receiving input from the microphone 310 (e.g., via Bluetooth, Wi-Fi, etc.), the laptop may also receive input from a built-in microphone 312 in the laptop 302 itself as well as input from a microphone 314 that is included on a stand-alone device 316 that has been attached to the top of the display of the laptop 302 as shown. Note that the device 316 might also include a camera 318 that may gather video of the user 300 to provide to the other client device of the other user 304 as part of the A/V conference, though in other examples a built-in camera of the laptop might also be used.

It may therefore be appreciated according to FIG. 3 that one or more processors configured with instructions according to present principles may have access to input from all three of the microphones 310, 312, and 314, with all three microphones picking up the same audible input from the user 300 (e.g., same spoken words and sounds). It may also be appreciated that the microphone 310 may generate input of higher quality based on the user's spoken words owing to its proximity to the user 300 compared to the microphones 312, 314 as located at a greater distance. However, one of the other microphones 312, 314 might still be selected by default as the operative microphone from which input is provided to the user 304 as part of the A/V conference based on operating system defaults, video conferencing application defaults, previous user preference/settings, etc. Absent present principles, this default operative microphone might still be used even though better-quality audio signals are available via the microphone 310.

Accordingly, employing present principles, a processor in the client device 302 and/or a processor in a universal serial bus (USB) device 320 inserted into a USB port of the client device 302 may receive the inputs from each microphone, select the microphone providing the best-quality inputs, and stream those inputs to the client device of the other user 304 as part of the audio of the A/V conference. Note here that processing speeds may be enhanced by doing so using a dedicated processor within the device 300 (such as one of the processors 191 mentioned above) and/or by using a similar processor embodied in the USB device 320 (e.g., a DSP in the USB device 320). However, also note that in some examples the CPU of the device 300 might perform similar processes in other examples where device security may be prioritized over enhanced processing speed (e.g., by minimizing the chance that communications between devices/processors would be intercepted), and/or because another processor is unavailable.

What's more, also note according to present principles that a microphone providing the best audio quality at a certain point in time (e.g., microphone 310 as described above) may unexpectedly break or stop working because of various reasons like mechanical issues, software driver issues, its battery running out, etc. Responsive to detecting such an issue, the processor may select the next best microphone (the microphone currently providing the best quality audio while microphone 310 is offline or powered off) to be used seamlessly and then continue providing audio as part of the audio conference even though the operative microphone has been switched.

Figure 4:
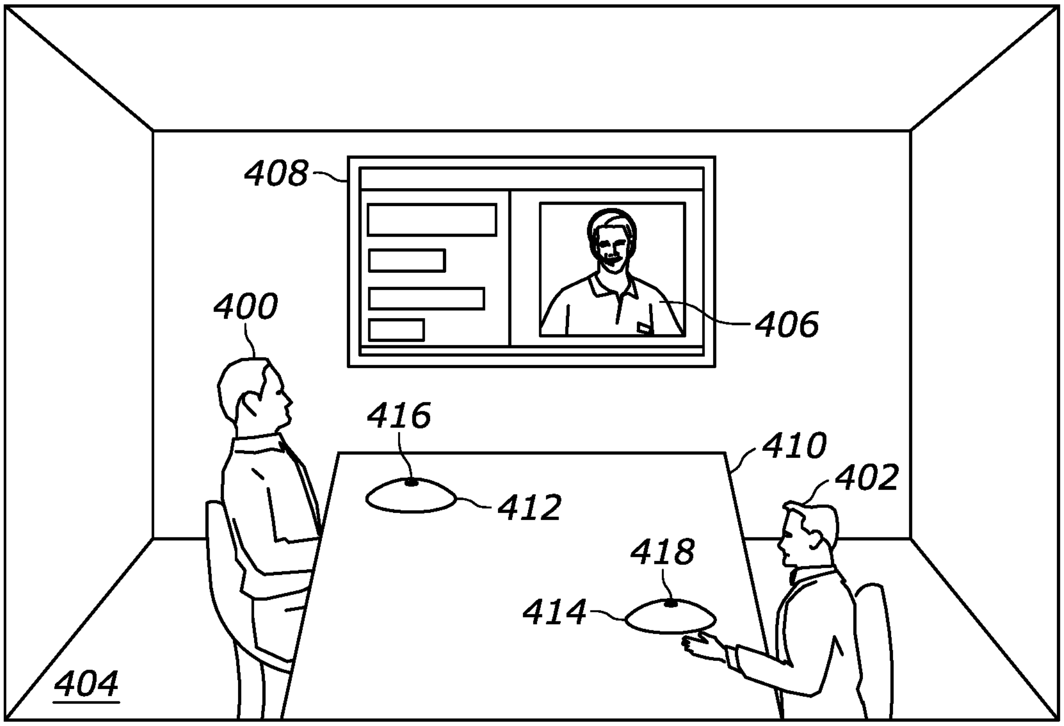

FIG. 4 shows another example illustration. In FIG. 4, two users 400, 402 are commonly-located in a physical conference room 404. The users 400, 402 are participating in a video conference with a remotely-located user 406, with audio and video of the user 406 presented via a wall-mounted television 408. As also shown in FIG. 4, a conference table 410 in the conference room 404 may have two client devices disposed at different locations, with the device 412 being nearer to the user 400 than the device 414 and with the device 414 being nearer to the user 402 than the device 412. These two devices 412, 414 might be smartphones, conferencing hub devices such as Lenovo ThinkSmart Hubs, or other types of client devices. In addition to possibly having speakers to present audio from the user 406 and having other components such as those described above in reference to the system 100, the devices 412, 414 may each have a microphone 416, 418. Each microphone 416, 418 may be active/powered on to each receive the same audible input from the users 400 and/or 402 as each user speaks.

Consistent with present principles, audio quality for input from each user 400, 402 may be assessed by the devices 412, 414 (and/or by another device like a coordinating server to which inputs from the microphones 416, 418 are streamed) to determine which input from which microphone has the best quality in a given instance (e.g., when one of the local users 400/402 speaks). Accordingly, in one example input from microphone 416 of the user 400 speaking may be provided to the client device of the remotely-located user 406 while input from microphone 418 of the other user 402 speaking may also be provided to the client device of the remotely-located user 406, thus aggregating multiple physical microphones into a microphone array so that audio signal processing can be used to dynamically select, for a given instance of speech from one of the users 400, 402, better audio to improve the overall sound quality of the video conference. As may be relevant in the present example, better audio may include audio of a higher volume level as sensed by a respective microphone 416, 418 nearer to a respective user 400, 402.

Also note consistent with present principles that the device(s) performing the determination mentioned above may continuously or periodically (e.g., every second to preserve power) monitor inputs from the microphones 416, 418 so that if the audio environment changes, which microphone is operative based on best quality for a given user may dynamically change on the fly. Thus, if the user 400 where to change location during the video conference so that that user 400 becomes nearer to the device 414 than the device 412, the microphone 418 may instead be used for providing audio of the user 400.

Figure 5:
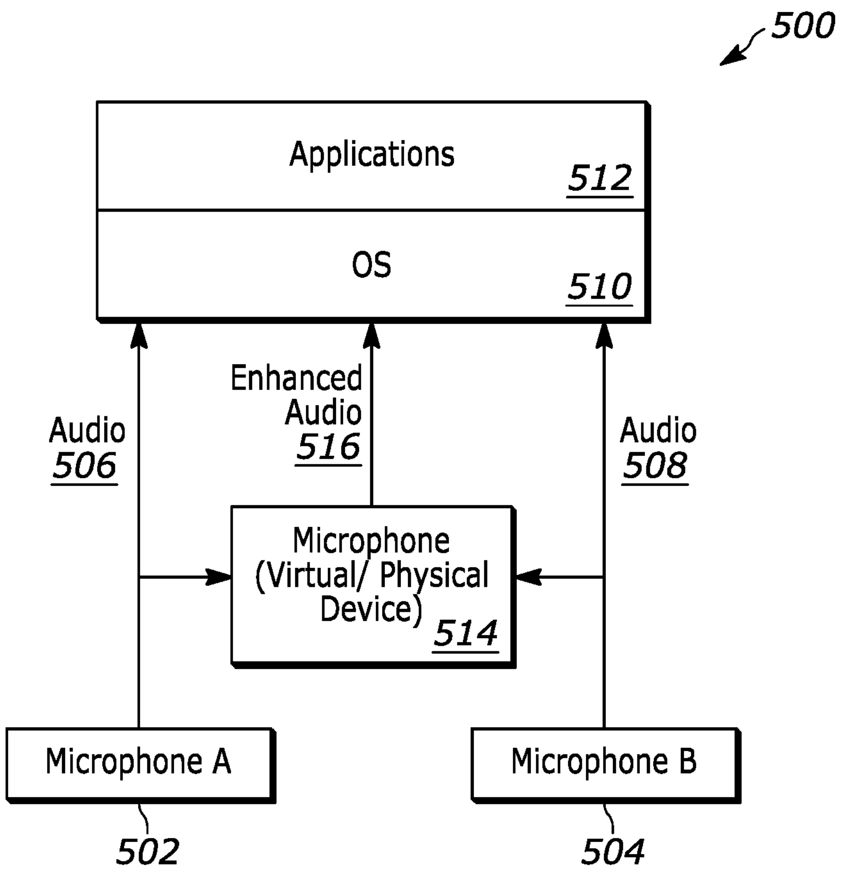
FIG. 5 shows a schematic diagram of example hardware/software architecture.

Now in reference to FIG. 5, a schematic diagram of example hardware/software architecture 500 consistent with present principles is shown. As shown in FIG. 5, a first physical microphone 502 and a second physical microphone 504 may provide respective input 506, 508 for processing to one or more of an operating system (OS) 510 (e.g., a guest operating system such as Windows, Android, or Mac OS), individual software applications ("apps") 512 executed by the OS 510 (e.g., video conferencing software apps such as Zoom or Teams), and/or a microphone device 514. So, for example, the raw or pre-processed inputs from the microphones 502, 504 may be provided to either of the OS 510 or app 512 for the OS 510 or app 512 to select and use better-quality inputs from one of the two microphones 502, 504 as enhanced audio in a given instance as described herein.

As for the microphone device 514, in various example embodiments the device 514 may be similarly used for processing the inputs 506, 508 to ultimately generate enhanced audio 516 consistent with present principles and then provide the audio 516 to the OS 510 and/or app 512 for streaming to remotely-located client devices. The device 514 may be a virtual device in that it may be a software module that processes the inputs 506, 508. Additionally or alternatively, the device 514 may be hardware such as a built-in DSP or an attached USB device like the device 320 that processes the inputs 506, 508.

Figure 6:
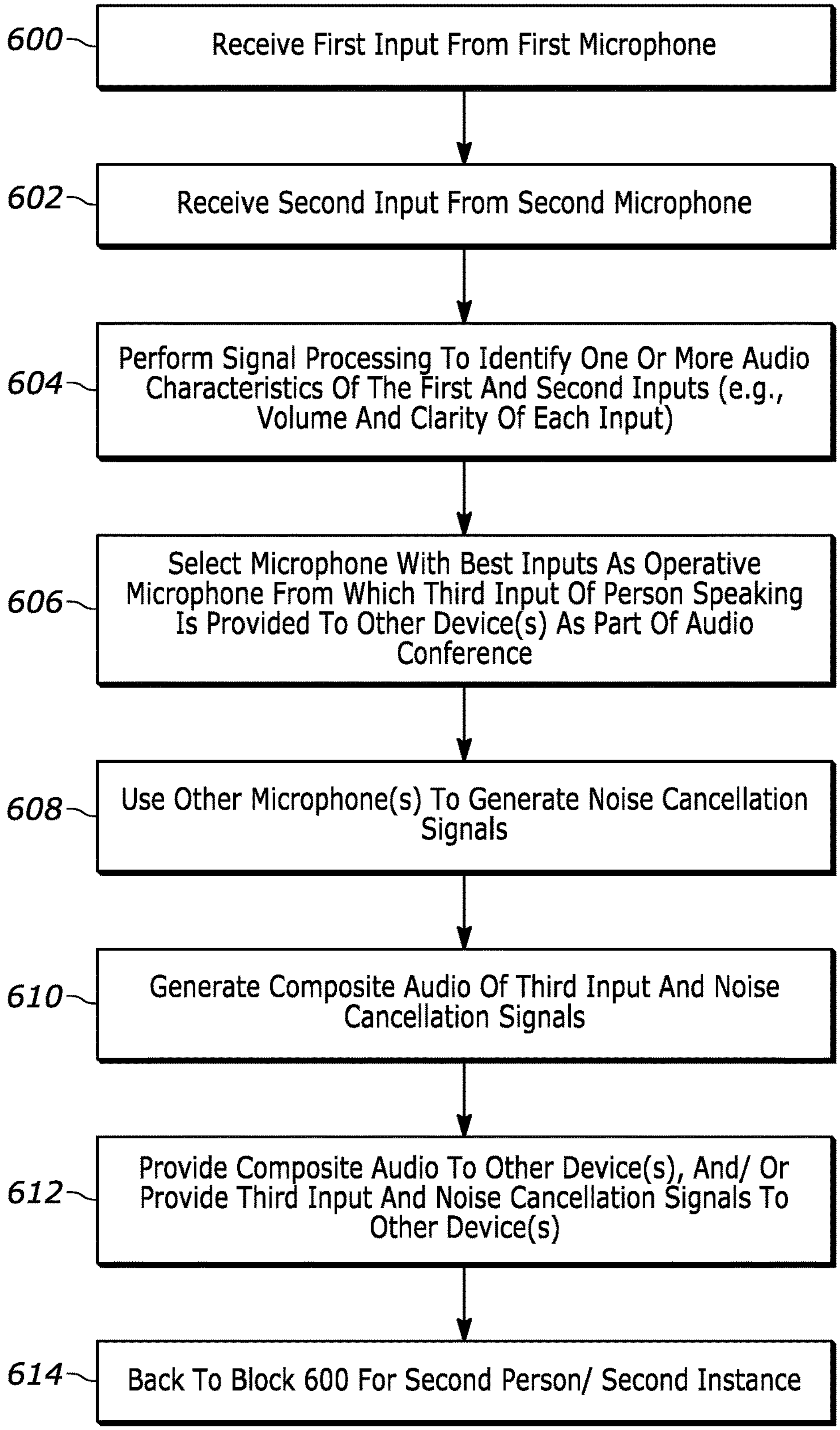
FIG. 6 illustrates example logic in example flow chart format that may be executed by a device consistent with present principles.

Continuing the detailed description in reference to FIG. 6, it shows example logic that may be executed consistent with present principles. For example, the logic may be executed by a client device and/or remotely-located coordinating server in any appropriate combination (e.g., a server that is routing A/V communications between client devices as part of an A/V conference). So, for example, the logic of FIG. 6 may be executed at the OS-level using the OS 510, at the app level using the app 512, and/or using the microphone device 514. Note that while the logic of FIG. 6 is shown in flow chart format, other suitable logic may also be used.

Beginning at block 600, the device may receive first input from a first microphone and then proceed to block 602 where the device may receive second input from a second, different microphone. The logic may then proceed to block 604 where the device may perform audio signal processing to identify one or more audio characteristics of the first and second inputs. Many different types of characteristics may be used by the device to assess audio quality consistent with present principles, with two examples being volume level and clarity/sharpness level. For example, the one or more identified audio characteristics may include a first volume level associated with the first input and a second volume level associated with the second input, and so the first microphone may be selected as the operative microphone based on the first volume level being greater than the second volume level. As another example, the one or more identified audio characteristics may additionally or alternatively include a first clarity level associated with the first input and a second clarity level associated with the second input, and so the first microphone may be selected as the operative microphone based on the first clarity level being better than the second clarity level (e.g., the first input may have a higher signal-to-noise ratio). Thus, it is to be understood that audio equalizers, digital signal processing techniques, signal-to-noise algorithms, and other types of software/processes may be used to evaluate quality.

The logic may then move from block 604 to block 606 where, based on the one or more identified audio characteristics of the first and second inputs, the device may select one of the first and second microphones as an operative microphone from which third input of a person speaking is provided to other devices as part of the audio conference. The logic may then proceed from block 606 to block 608.

At block 608 the device may in some examples use input from other microphones that do not have the best audio quality in this given instance to generate noise cancellation signals using one or more active noise cancellation algorithms. So, for example, if the first microphone is selected as the operative microphone from which the third input is provided to other devices, the device may also use the second input from the second microphone to generate noise cancellation signals to cancel ambient noise, background voices, etc. that might also be detected while the relevant person is speaking as indicated in the third input itself. This might be particularly useful where the source of the sound to be canceled is closer to the second microphone than the first microphone, allowing the noise cancellation signals to be generated (and eventually multiplexed with the third input) while that sound continues to travel to the first microphone for effective, real-time noise cancellation.

Depending on implementation, the logic may then proceed to either of blocks 610 or 612. If the logic proceeds directly to block 612 from block 608, at block 612 the device may provide both the third input of the person speaking and the noise cancellation signals to the other device(s) as part of the audio conference so that other end-point client devices participating in the conference may present audio generated from the third input and/or the noise cancellation signals themselves. For example, the device may provide the third input and noise cancellation signals directly to other client devices (e.g., if the device of FIG. 6 is itself a coordinating server or even another client device) or to a coordinating server for routing to other client devices (e.g., if the device of FIG. 6 is a client device in particular).

However, if the logic proceeds from block 608 to block 610 first, at block 610 the device may generate composite audio signals that include both the third input and the noise cancellation signals so that the other devices themselves do not need to separately process the noise cancellation signals and can instead simply present the composite audio signal as already processed by the device of FIG. 6. Accordingly, here the logic may then proceed from block 610 to block 612 where the device of FIG. 6 may provide the composite audio signals to the other device(s) as part of the audio conference.

From block 612 the logic may then proceed to block 614. At block 614 the logic may move back to block 600 to proceed again therefrom to process additional microphone input as part of the same audio conference (e.g., as might occur according to the example of FIG. 4). Accordingly, in certain specific example implementations the one or more identified audio characteristics from above may be first one or more identified audio characteristics, and the person may be a first person. In these implementations, the device may then, in a first instance and based on the first one or more identified audio characteristics of the first and second inputs, select the first microphone as the operative microphone from which the third input of the first person speaking is provided to the second device as part of the audio conference. Then, still in in the first instance, the device may provide the third input from the first microphone to the second device as part of the audio conference. Then in a second instance subsequent to the first instance but still as part of the same audio conference, the device may receive fourth input from the first microphone and fifth input from the second microphone. Then, still in the second instance and based on second one or more identified audio characteristics of the fourth and fifth inputs, the device may select the second microphone as an operative microphone from which sixth input of a second person speaking is provided to the second device as part of the audio conference (e.g., with the second person being different from the first person, or being the same as the first person in instances where the first person has changed locations relative to stationary microphones and hence a different microphone might pick up spoken words with better quality in the second instance). Then also in the second instance, the device may provide the sixth input of the second person speaking to the second device as part of the audio conference.

Figure 7:
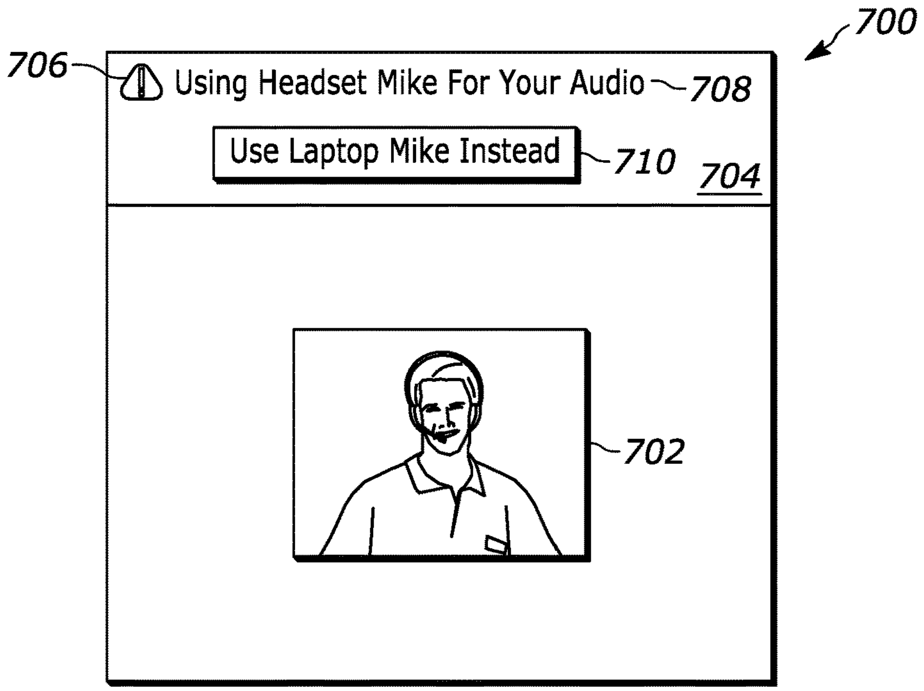
FIG. 7 shows an example graphical user interface (GUI) that may be presented on a display during audio conferencing consistent with present principles.

Before moving on to the description of FIG. 7, note with respect to the logic of FIG. 6 that in various example implementations the steps described above, including the selection of one of the first and second microphones as the operative microphone, may be performed in a kernel of the first device (e.g., a kernel of the first device's guest OS where the user cannot affect or control processing of the input), by an audio conferencing software app executed by the OS, by a separate USB device as described above, etc.

Also note that the first or second input from the microphone that is ultimately selected as the operative one may be the same or different input as that actually provided to the other devices as part of the conference. So, for example, if the first microphone is selected, the first input may be the same as or different from the third input itself that is ultimately provided to the other devices. Thus, e.g., the first and second inputs may be evaluated for quality and then the first input may be routed to the other devices. Or as another example, the first and second inputs may be test inputs or initial utterances of a given audible input sequence from a single person, and then ensuing and different third input that forms part of the same utterance may be routed to the other devices.

Now in reference to FIG. 7, an example graphical user interface (GUI) 700 is shown that may be presented on the display of a client device operating consistent with present principles (e.g., a device executing the logic of FIG. 6 during an A/V conference). As shown, the GUI 700 may include a live, real-time video stream 702 of a remotely-located participant.

As also shown in FIG. 7, the GUI 700 may include a panel 704 that may include a non-text graphical object such as an icon 706 as well as text 708 that both indicate that the client device has selected a microphone on a headset as the microphone from which input will be received and streamed to the remotely-located user as part of the conference. So, for example, the icon 706 and text 708 may be presented based on the outcome of microphone selection at block 606 as described above so that the user may verify which microphone is being used to stream their audible input.

However, if for some reason the user wished to use a different microphone instead, the user may select selector 710 to command the client device to instead receive and stream input from another active, available microphone rather than the headset's microphone. Thus, text on the selector 710 may identify the other microphone that may be used, which in the present example is a built-in laptop microphone.

Figure 8:
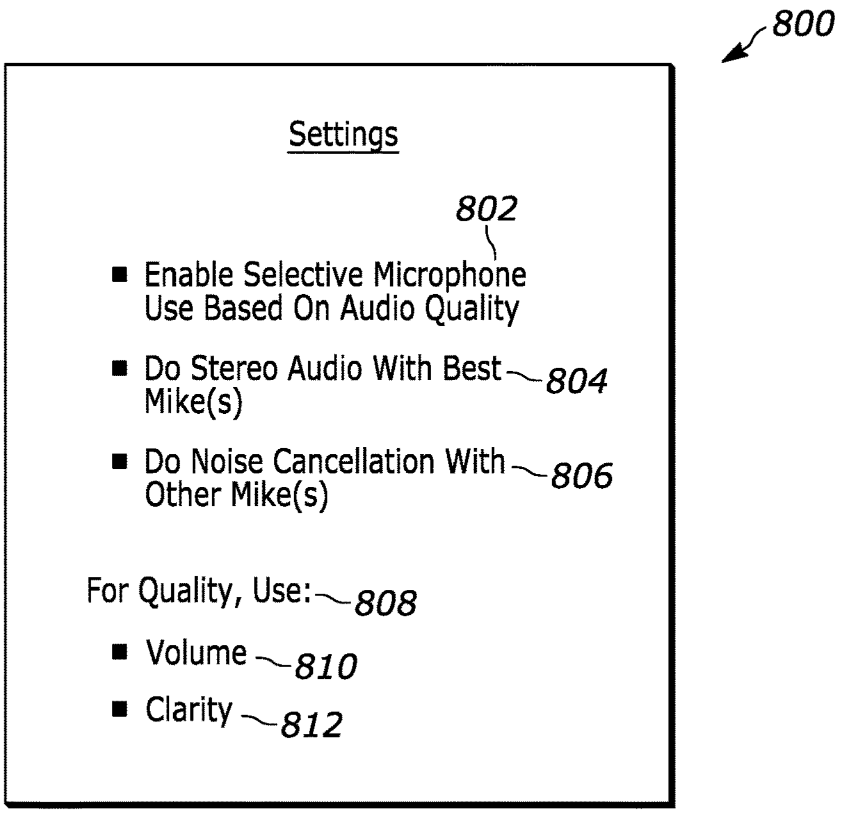
FIG. 8 shows an example settings GUI that may be presented on a display to configure one or more settings of a device to operate consistent with present principles.

Continuing the detailed description in reference to FIG. 8, it shows an example settings GUI 800 that may be presented on a display of a device to configure one or more settings of the device to operate consistent with present principles. For example, the GUI 800 may be presented by navigating a device or app menu at a client device that is being or will be used for audio conferencing. Also note that in the example shown, each option discussed below may be selected by directing touch or cursor or other input to the respective check box adjacent to the respective option.

As shown in FIG. 8, the GUI 800 may include an option 802 that may be selectable a single time to set or enable the device to undertake present principles in multiple future instances/different audio conferences (e.g., to dynamically select from available microphones for streaming audible input from a person as part of an audio conference). For example, selection of the option 802 may configure the device to execute the logic of FIG. 6, present the GUI 700 of FIG. 7, execute the other actions described in reference to FIGS. 3-5, etc.

As also shown in FIG. 8, the GUI 800 may include an option 804 that may be selectable to configure the device to generate one or more stereo audio signals (e.g., left and right audio channels) using mono audio signals from a selected microphone producing the best quality input in a given instance. For example and according to the logic of FIG. 6, the first and second inputs may both relate to the same audible input from a user but may have slightly different timestamps owing to the detecting microphones themselves being located at different respective distances from the sound source, and so those timestamps may be used as offsets for generating stereo audio signals that themselves use the third input from the selected microphone as the base audio (while not using input from the non-selected microphone for generating the stereo audio signals to in essence generate a synthetic stereo audio signal with higher audio fidelity than if input from both microphones where used to generate the stereo audio).

In some examples, the GUI 800 of FIG. 8 may also include an option 806. The option 806 may be selected to command the device to generate noise cancellation signals in conformance with the disclosure above so that the noise cancellation signals may be provided with input from a selected microphone of a person speaking as part of an audio conference consistent with present principles.

Additionally, if desired a setting 808 may also be included on the GUI 800. The setting 808 may be related to audio quality, and as such may include an option 810 for the end-user to select volume as one metric of audio quality and an option 812 for the end-user to select clarity as another metric of audio quality.

Moving on from FIG. 8, note that present principles may be implemented not only for voice over Internet protocol (VoIP) and app-based Internet audio conferences (e.g., A/V conferences specifically) but also for telephone audio conferences occurring between two or more people over terrestrial telephone lines, cellular telephone lines like 5G lines, etc.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:

at least one processor; and storage accessible to the at least one processor and comprising instructions executable by the at least one processor to:

receive first input from a first microphone;

receive second input from a second microphone, the second microphone being different from the first microphone;

based on one or more identified audio characteristics of the first and second inputs, select the first microphone as an operative microphone to use for generating stereo audio signals from mono audio signals provided by the first microphone but not from mono audio signals provided by the second microphone;

use third input from the second microphone to determine an offset to use for generating the stereo audio signals;

generate, using the offset and the mono audio signals from the first microphone, the stereo audio signals; and provide the stereo audio signals to a second device as part of an audio conference.

2. The first device of claim 1, wherein the one or more identified audio characteristics comprise a first volume level associated with the first input and a second volume level associated with the second input, and wherein the first microphone is selected as the operative microphone based on the first volume level being greater than the second volume level.

3. The first device of claim 1, wherein the one or more identified audio characteristics comprise a first clarity level associated with the first input and a second clarity level associated with the second input, and wherein the first microphone is selected as the operative microphone based on the first clarity level being better than the second clarity level.

4. The first device of claim 1, wherein the instructions are executable to:

use the second microphone to generate one or more noise cancellation signals for the audio conference.

5. The first device of claim 4, wherein the instructions are executable to:

provide the one or more noise cancellation signals to the second device as part of the audio conference.

6. The first device of claim 4, wherein the instructions are executable to:

generate composite audio signals comprising both the stereo audio signals and the one or more noise cancellation signals; and provide the composite audio signals to the second device as part of the audio conference.

7. The first device of claim 1, wherein the audio conference is an audio/video (A/V) conference.

8. The first device of claim 1, wherein the selection of one of the first and second microphones is performed in a kernel of the first device.

9. The first device of claim 1, wherein the third input comprises the second input.

10. The first device of claim 1, wherein the stereo audio signals establish left and right audio channels.

11. A method, comprising:

receiving, at a first device, first input from a first microphone;

receiving, at the first device, second input from a second microphone, the second microphone being different from the first microphone;

based on one or more identified audio characteristics of the first and second inputs, selecting the first microphone as an operative microphone to use for generating stereo audio signals from mono audio signals provided by the first microphone but not from mono audio signals provided by the second microphone;

using third input from the second microphone to determine an offset to use for generating the stereo audio signals;

generating, using the offset and the mono audio signals from the first microphone, the stereo audio signals; and providing the stereo audio signals to a second device as part of an audio conference.

12. The method of claim 11, wherein the selecting of the first microphone is performed in a kernel of the first device.

13. At least one computer readable storage medium (CRSM) that is not a transitory signal, the at least one CRSM comprising instructions executable by at least one processor to:

receive first input from a first microphone;

receive second input from a second microphone, the second microphone being different from the first microphone;

based on one or more identified audio characteristics of the first and second inputs, select the first microphone as an operative microphone to use for generating stereo audio signals from mono audio signals provided by the first microphone but not from mono audio signals provided by the second microphone;

use third input from the second microphone to determine an offset to use for generating the stereo audio signals;

generate, using the offset and the mono audio signals from the first microphone, the stereo audio signals; and provide the stereo audio signals to a client device as part of an audio conference.

14. The at least one CRSM of claim 13, wherein the third input comprises the second input.

15. The at least one CRSM of claim 13, wherein the stereo audio signals are synthetic stereo audio signals.

16. The at least one CRSM of claim 13, wherein the stereo audio signals establish left and right audio channels.

17. The at least one CRSM of claim 13, wherein the instructions are executable to:

use a timestamp associated with the third input to determine the offset.

18. The at least one CRSM of claim 13, wherein the selection of the first microphone is performed in a kernel of the first device.

19. The at least one CRSM of claim 13, wherein the selection of the first microphone is performed by an audio conferencing software application.

20. The at least one CRSM of claim 13, wherein the selection of the first microphone is performed by a first processor that is different from a central processing unit (CPU) of a second device, the first processor being a processor in a universal serial bus (USB) device inserted into a USB port of the second device, the second device being different from the client device.

* * * * *